United States Patent [19]

Köjer

[11] Patent Number: 5,240,309
[45] Date of Patent: Aug. 31, 1993

[54] VEHICLE SEAT, ESPECIALLY A MOTOR VEHICLE SEAT

[75] Inventor: Wolfgang Köjer, Donsieders, Fed. Rep. of Germany

[73] Assignee: Keiper Recaro GmbH & Co., Fed. Rep. of Germany

[21] Appl. No.: 683,826

[22] Filed: Apr. 11, 1991

[30] Foreign Application Priority Data

Apr. 23, 1990 [DE] Fed. Rep. of Germany ....... 4012860

[51] Int. Cl.$^5$ ............................................. B60N 2/02
[52] U.S. Cl. ............................ 297/378.12; 297/354.1; 296/65.1
[58] Field of Search ................ 297/379, 378, 354, 300, 297/342; 296/65.1

[56] References Cited

U.S. PATENT DOCUMENTS

| | | | |
|---|---|---|---|
| 3,957,312 | 5/1976 | Bonnaud | 297/379 X |
| 3,999,247 | 12/1976 | Cremer | 16/146 |
| 4,015,877 | 4/1977 | Button | 296/65.1 X |
| 4,269,446 | 5/1981 | Gersmann et al. | 297/341 |
| 4,312,537 | 1/1982 | Lindenberg | 297/379 X |
| 4,846,520 | 7/1989 | Acuto et al. | 296/65.1 |
| 5,007,680 | 4/1991 | Miyauchi et al. | 297/379 |

FOREIGN PATENT DOCUMENTS

| | | | |
|---|---|---|---|
| 2803351 | 8/1979 | Fed. Rep. of Germany | 297/379 |
| 3222758 | 12/1983 | Fed. Rep. of Germany | |
| 3835528 | 4/1988 | Fed. Rep. of Germany | |

Primary Examiner—Kenneth J. Dorner
Assistant Examiner—Milton Nelson, Jr.
Attorney, Agent, or Firm—Wigman, Cohen, Leitner & Myers

[57] ABSTRACT

A vehicle seat, especially a motor vehicle seat, with a backrest that can be swung freely and with an interlock device by means of which a flipping motion of the backrest can be prevented in positive locking fashion. The interlock device has a catch lever whose hinge point lies between its first end section, which interacts with a stop and its second end section. The latter is pivotably connected to a second lever by means of a pivot pin whose longitudinal axis lies parallel to the flipping axle of the backrest. The second lever is connected, in the area of the stop to the part of the seat, said part supporting the stop. It is connected so that it can pivot about an axis that is parallel to the pivoting axis of the catch lever. When the interlock device is in its interlock position, the longitudinal axis of the pivot pin, the pivoting axis of the catch lever, and the contact point of the stop for the catch lever define a triangle whose tip is formed by the pivot axis of the catch lever and points towards the flipping axle.

10 Claims, 5 Drawing Sheets ly towards the seat. More particularly, the invention
VEHICLE SEAT, ESPECIALLY A MOTOR VEHICLE SEAT

BACKGROUND OF THE INVENTION

1. Field of the Invention

The invention relates to a vehicle seat, especially a motor vehicle seat, which has a backrest which is pivotable towards the seat. More particularly, the invention relates to a locking mechanism for such seats.

2. Description of the Prior Art

DE 32 22 758 and U.S. Pat. No. 3,999,247 disclose mountings for such seats. The use of free-swinging devices, e.g., a locking element in the form of a hook or a latch makes it possible to tilt the backrest of the seat forward without needing to activate the adjustment device for the inclination of the backrest. This locking element is pivotably mounted at the mounting and can be activated through a pulley arrangement. The hook is associated with a pin which it can grip rearwardly and the latch is associated with a catch which can receive its free end. In order for the hook to rearwardly grip the pin and allow the latch to fall into the catch, a sufficiently large tolerance or functional play must be provided between the interacting parts. As a result of this play, the backrest has a certain freedom of motion even when the interlock device is in its locked position. This freedom of motion produces a rattle when the seat is not being used. More importantly, with these known free-swinging devices, even where the backrest has been completely swung back into its end position the backrest may not be securely locked in position. For example, the spring force applied to the hook or the latch may not be sufficient to swing the hook or the latch into its locking position. If the backrest is not locked, serious injury can occur in case of an accident.

OBJECTS AND SUMMARY OF THE INVENTION

It is therefore a principal object of the invention to provide a vehicle seat with a free-swinging device for its backrest, such that the backrest will be securely locked when it swings back from a forwardly tilted position.

Another object of the present invention is to provide a vehicle seat, as aforementioned, which includes means for securely locking the backrest when returned to its upright position.

Other objects and advantages of the present invention will become apparent from the description which follows. In sum, the locking mechanism includes a catch lever and a second lever which are moved when the mount is pivoted together with the backrest. This guarantees that the catch lever contacts the stop, as soon as the backrest has reached its end position when it is being flipped back. The catch lever and the second lever form a knee link. When the backrest is swung back from its forwardly tilted position, this knee link comes from one buckle position beyond the completely extended position into its other buckle position, where the stop for the catch lever limits the buckling in positive locking fashion. Consequently, a positive interlock without functional play exists in the locked position. As a result of the knee link formed both a rearward stress and a forward stress on the backrest will press the catch lever even more strongly against the stop. For this reason, the backrest is not only positively locked in the lock position of the free-swinging device, but is also locked in a manner that is free of play.

Another important advantage of the present invention is that this positive interlock, which is also free of play, is achieved with only little extra effort, namely with only an additional pivotably mounted lever. Consequently, no significant additional space is required in comparison to known vehicle seats with a free-swinging device. Preferably, a pre-tensioned spring acts on the second lever at some distance from its pivoting axis. By way of the pivot pin, which connects the second lever to the catch lever, this spring loads the latter in the sense of a motion towards the stop. The spring not only tries to keep the catch lever in contact with the stop but also assures that the catch lever and the second lever do not remain in that pivoted position, in which the knee link is completely extended.

In a preferred embodiment, the stop is formed by a bolt disposed parallel to the flipping axis. The second lever can then be pivotably mounted thereon.

For the locking device to be functional, it is sufficient for the catch lever, in its interlock position, to contact the stop which extends into its path of motion. It is especially advantageous to extend the catch lever beyond the point which contacts the stop in the interlock position, and to form this extension as a hook which engages the stop with some backlash in the interlock position. Such a hook provides an additional advantage in the event that the backrest is overloaded. When overloaded, the distances between the stop and the pivoting axis of the catch lever increase due to a deformation of the lever and/or the stop. The hook contacts the stop and engages it in positive locking fashion. The forces which apply stress to the interlock should not be able to swing the lever into an angular position which would release the stop. However, activation of the unlocking device which acts on the hook should be able to accomplish this. For this reason, in a preferred embodiment, the hook has a preferably flat contact surface which encloses an angle with the tangent to the stop, such that this angle lies in the self-inhibiting region. This increased safety is another advantage, just as is the transfer of the load acting on the backrest, via the mount at the catch lever, into the seat structure.

At its second end section, the catch lever can have a protrusion emerging from the pivot plane. This protrusion lies in the path of motion of the second lever. When the second lever contacts this protrusion, it prevents the mount from flipping forward further, and it does so in positive locking fashion. Thus, the forward flipping motion of the backrest and especially also the associated cushion pressure can be limited in simple fashion.

During a free-swinging motion, the entire mount is pivoted about the flipping axis. Consequently, a mechanism can be coupled with the mount, so as to associate a longitudinal forward motion of the seat with the forward flipping motion, and again a rearward motion of the seat into its initial position with the rearward flipping motion.

BRIEF DESCRIPTION OF THE DRAWINGS

The invention is explained in more detail below by way of a preferred embodiment that is shown in the drawing.

DETAILED DESCRIPTION OF A PREFERRED EMBODIMENT

Figure 1:
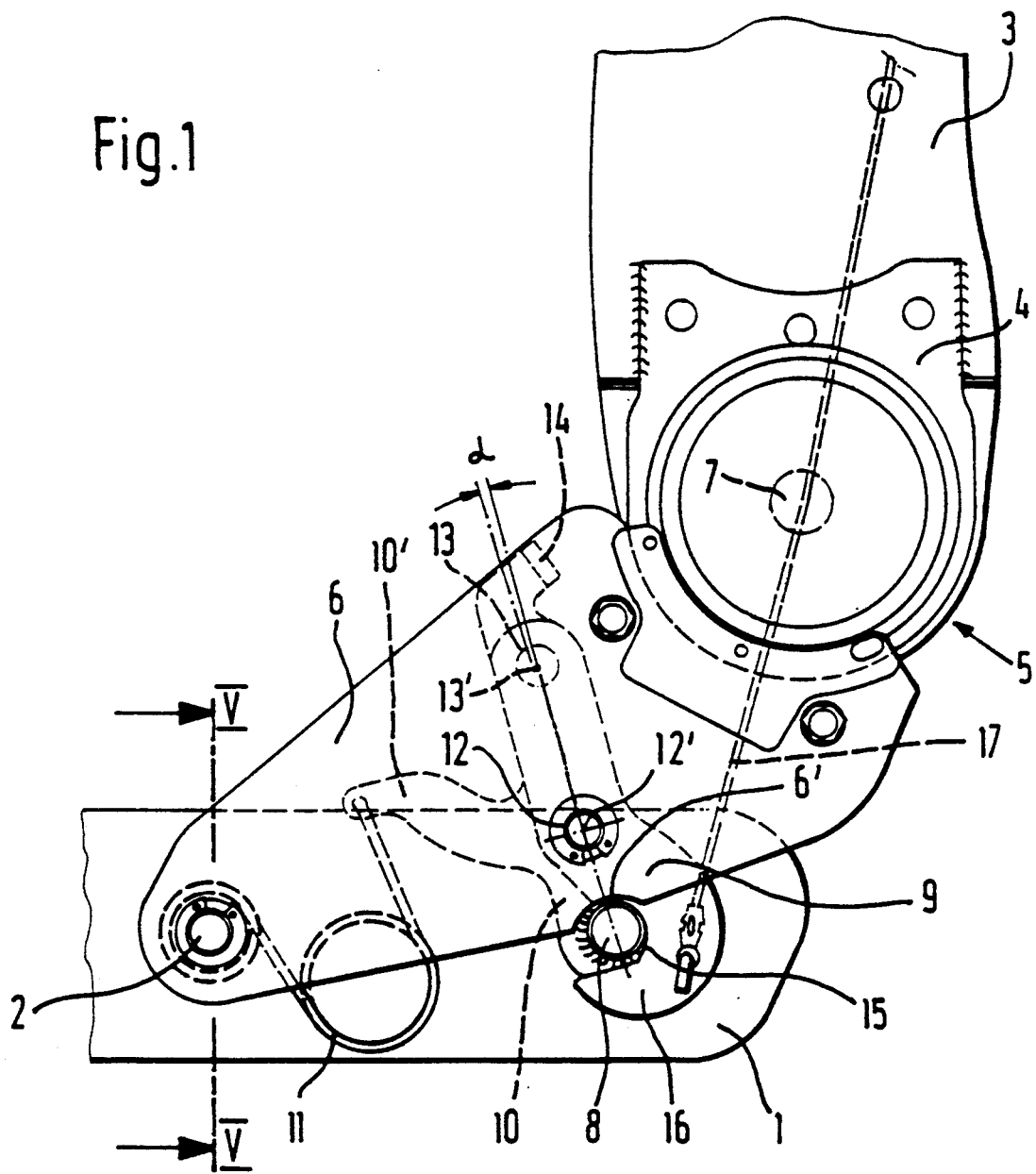
FIG. 1 shows an incomplete side view of the seat construction according to the present invention in the locked position.
Figure 2:
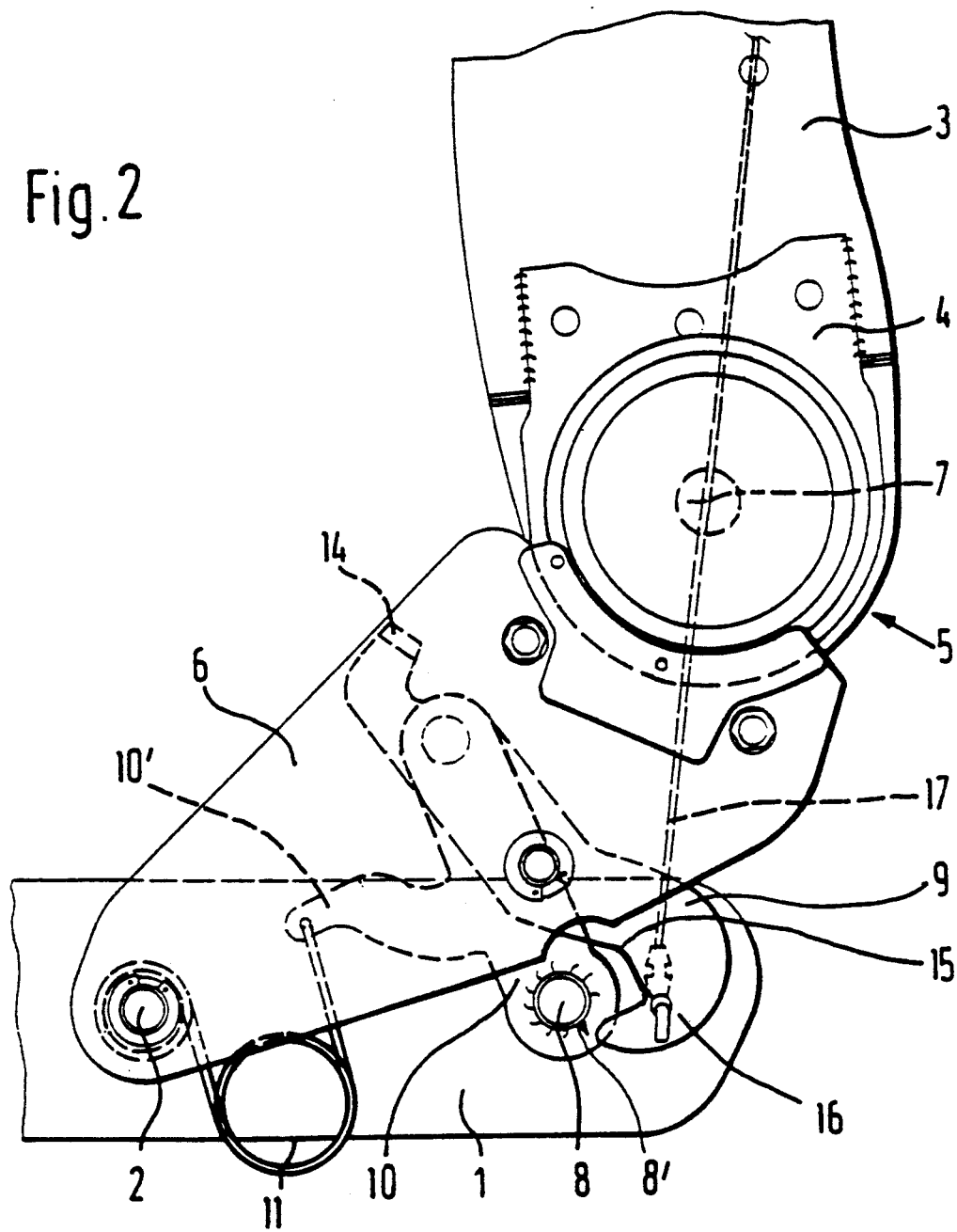
FIG. 2 shows an incomplete side view of the seat construction according to the present invention when the backrest is in a position at the beginning of the forward swinging motion, after the catch lever has been pivoted into the release position by means of the release device.

Referring now to the drawings wherein like numerals designate like parts throughout the several views, there is shown, in part a vehicle seat with a pivotable (or flippable) backrest. The vehicle seat has a longitudinal strut 1 on each side of its seat part. Together with other parts, which are not shown, these longitudinal struts form a seat structure, which supports a cushion support (not shown) for the seat cushion. Typically, the seat structure is connected to the floor of the vehicle by way of a pair of rails which permit longitudinal motion. Such construction is well known and needs no further elaboration.

As seen in FIG. 1, the two longitudinal struts 1 carry a flipping axle 2, which extends in the transverse direction of the seat. By means of flipping axle 2, the backrest is pivotably connected to the longitudinal strut 1. A pair of side struts 3 for carrying the cushion support of the backrest is provided, although only one is shown. The two struts 3 are connected to the upper mounting part 4 of separate hinge mounts 5. The lower mounting part 6 is pivotably connected to the flipping axle 2, at its forward end which is situated adjacent to its associated longitudinal strut 1. The lower mounting part 6 is pivotably connected to the upper mounting part 4 by axle 7 which is positioned parallel to the flipping axle 2. A self-inhibiting drive (not shown) connects the two mounting parts in well-known fashion, and makes it possible to adjust the inclination of the backrest.

In FIG. 1, the lower mount part 6 and thus the backrest is in a positively locked condition. The locking device provided for includes a stop pin 8, a catch lever 9, a second lever 10, and a pre-tensioned leg spring 11. The lower side of the lower mounting part 6, and especially the cutout section 6' is located adjacent stopping pin 8. In this position, the backrest is in an upright condition at the rearward end of the flipping range of the free-swinging motion.

The second lever 10 is situated between the inside of the lower mounting part and the outside of the longitudinal strut 1. It is pivotably mounted on the stop pin 8. In the interlock position, it extends towards the top and towards the front, terminating at some distance below the upper edge of the lower mounting part 6. Second lever 10 includes a forwardly protruding arm 10'. The arm 10' ends at some distance above and behind the flipping axle 2. One leg of the leg spring 11 is suspended in the free end section of the arm 10'. Its other leg engage the flipping axle 2 and thus is rotatably supported at this axle. The leg spring 11 tries to swing the second lever 10 towards the rear, that is clockwise with a viewing direction according to FIG. 1.

Figure 5:
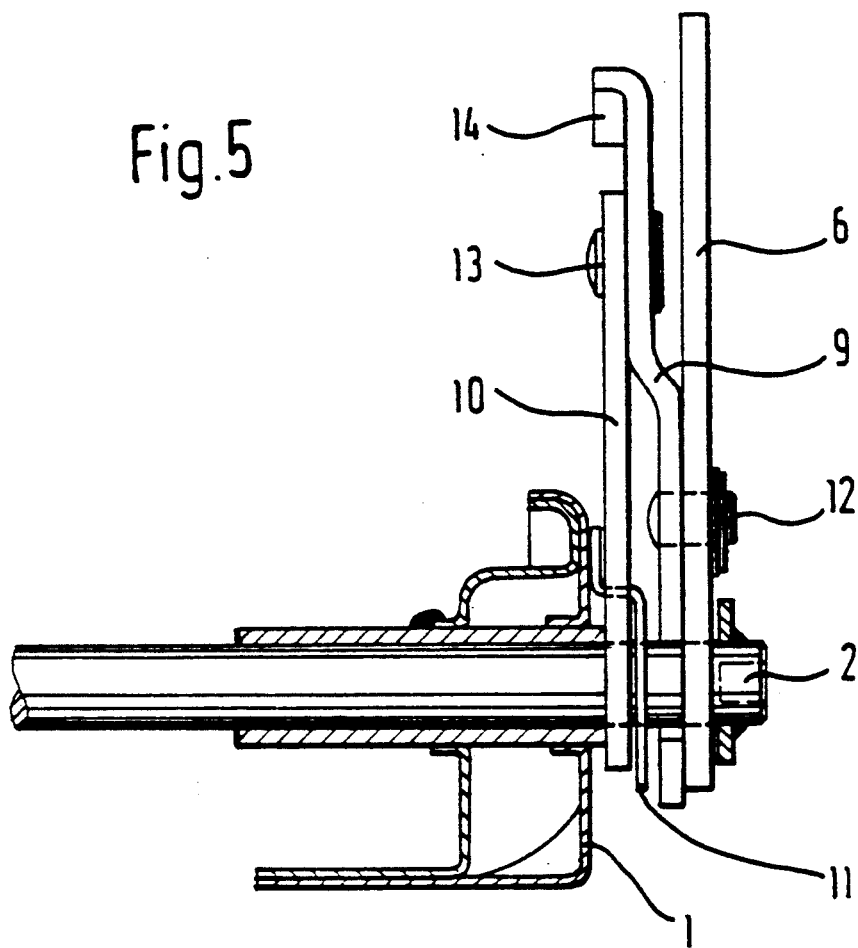
FIG. 5 is a sectional view, in elevation, taken along line V—V of FIG. 1.

The catch lever 9 is situated between the lower mounting part 6 and the second lever 10. It is pivotably connected to the lower mounting part 6 in the direction in which the second lever 10 extends, and it is connected at some distance above the stop pin 8. This connection is made by means of a mounting pin 12. The longitudinal axis 12' defining the pivot of the mounting pin 12 axis of catch lever 9 is parallel to the longitudinal axis of the flipping axle 2 and of the stop pin 8. As shown in FIGS. 1 and 5, the catch lever 9 extends beyond the mounting pin 12, in the longitudinal direction of the second lever 10. It is pivotably connected to the second lever 10 in the area of the latter's upper end section. This connection is accomplished by means of a pivot pin 13. The pivot pin 13 is parallel to the mounting pin 12, but is not connected to the lower mounting part 6.

Figure 4:
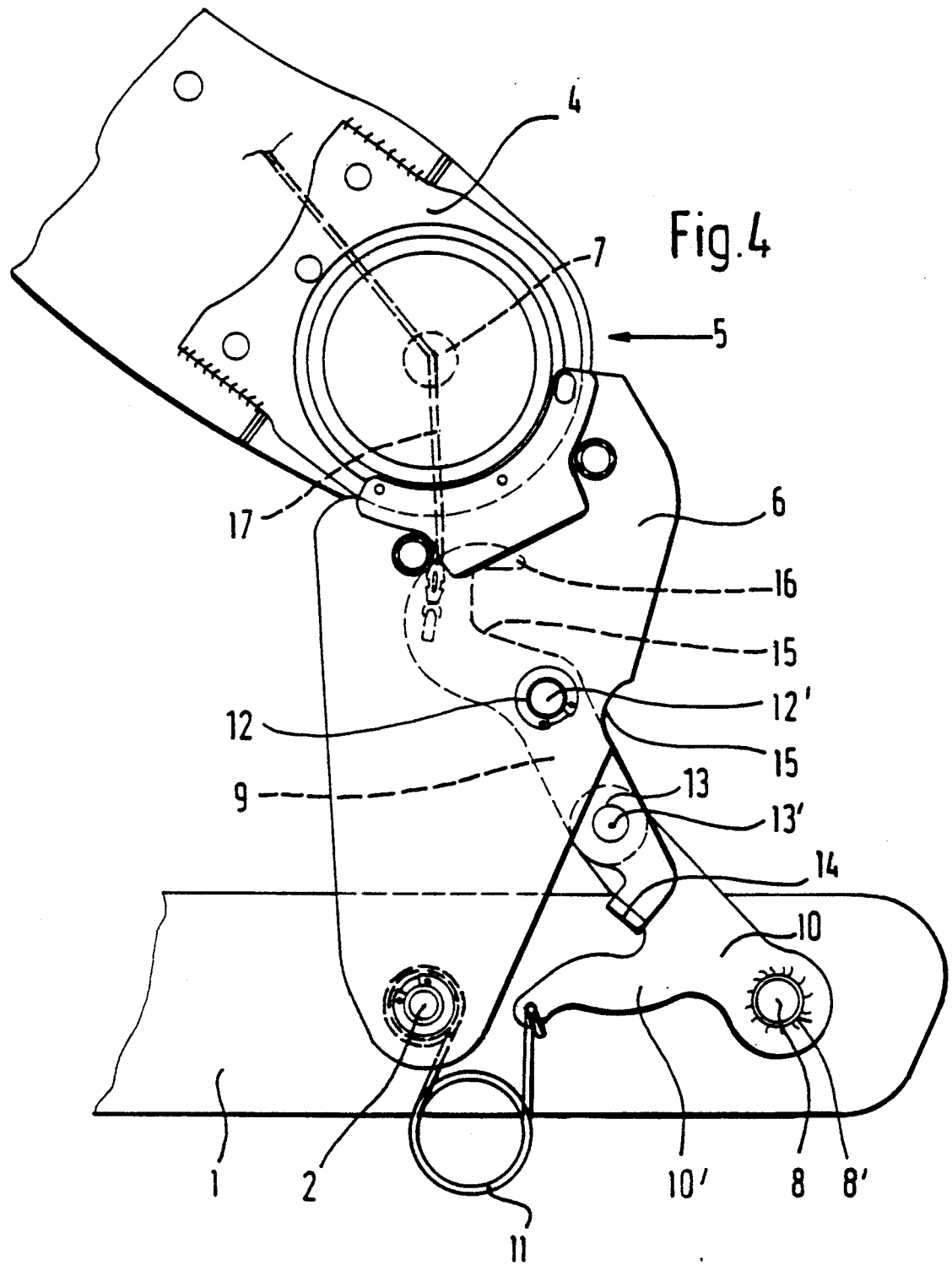
FIG. 4 shows an incomplete side view of the seat construction according to the present invention when the backrest is in its most forward flip position.

Also shown in FIGS. 1 and 5, the catch lever 9 extends beyond the pivot pin 13 as far as the upper edge of the lower mounting part 6. The lateral protrusion 14 of the catch lever 9 is bent at a right angle. As a result, this protrusion 14 extends into the pivoting path of the second lever 10. As FIG. 4 shows, the protrusion 14 contacts the second lever 10 at the front end of the flipping range of the backrest. In this way, it provides a positive forward limit to the flipping range.

Figure 6:
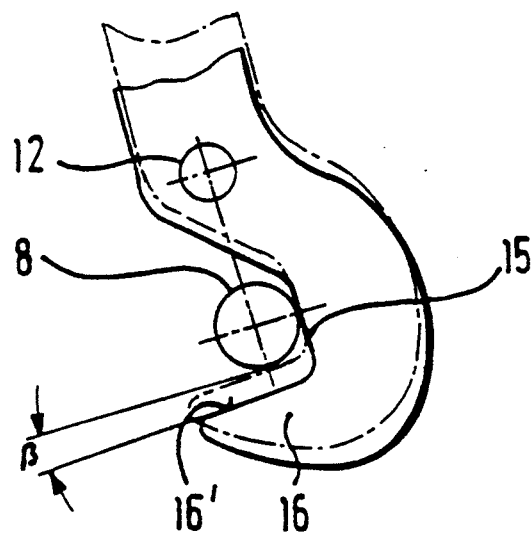
FIG. 6 is an enlarged view on the stop and of that part of the catch lever that is associated with it. The locked position, which prevails under normal load, is here shown with a solid line, and the locked position which prevails under an overload is shown with a dashed line.

When the catch lever 9 is in its interlock position, one of its arms extends from the mounting pin 12 downwards and rearwards, as is especially shown in FIG. 6. Its side which faces the flipping axle 2 has a straight contact surface 15 which, when the catch lever 9 is in its interlock position, contacts the stop pin 8 without any play at a contact point 8'. As shown in FIGS. 1 and 6, the catch lever 9 extends beyond the section which as the contact surface 15, and forms a hook 16, which normally engages the stop pin 8 with some play, when the contact surface 15 contacts the stop 8. The straight contact surface 15 permits motion in its longitudinal direction, as is indicated in FIG. 6 by the dashed position, until the likewise straight inside surface 16' of the hook 16 engages the stop pin 8. Such a motion will occur when the interlock device is overloaded. The inside surface 16', together with a tangent to the stop pin 8, which lies at a right angle to the line running through the center of the stop pin 8 and the mounting pin 12, encloses an angle $\beta$ which lies in the self-inhibition region (FIG. 6). For this reason, the catch lever can be swung out from its interlock position only by means of an unlocking device which acts on it. In this embodiment, the unlocking device is a pulley or cable 17.

The mutual position of the stop pin 8, the bearing pin 12, and the pivot pin 13 is chosen so that the catch lever 9 and the lever 10 enclose a small angle $\alpha$ (FIG. 1). More precisely, the longitudinal axis 13' of the pivot pin 13 and the longitudinal axis 12' of the bearing pin 12, as well as the contact point 8' of the stop pin 8 for the catch lever 9, define the three corners of a triangle, and the tip of this triangle, formed by the longitudinal axis 12' of the bearing pin 12, points to the flipping axle 2. According to the invention, the longitudinal axes of the stop pin 8, the bearing pin 12 and the pivot pin 13 also form such a triangle when the interlock device is situated in its locked position as shown in FIG. 1. The angle enclosed by the two sides of the triangle that extends towards its tip is less than 180°. Through this position of the stop pin 8, the bearing pin 12, and the pivot pin 13, the catch lever 9 and the second lever 10 form a toggle lever which, in the interlock position, is pressed through beyond the extended position, by the angle $\alpha$, towards the flipping axle 2. As a consequence, both a rearward and a forward load on the backrest cause the catch lever 9 to press more strongly against the stop pin 8, because both loads act in the sense of reinforcing the buckling of the toggle lever.

Figure 3:
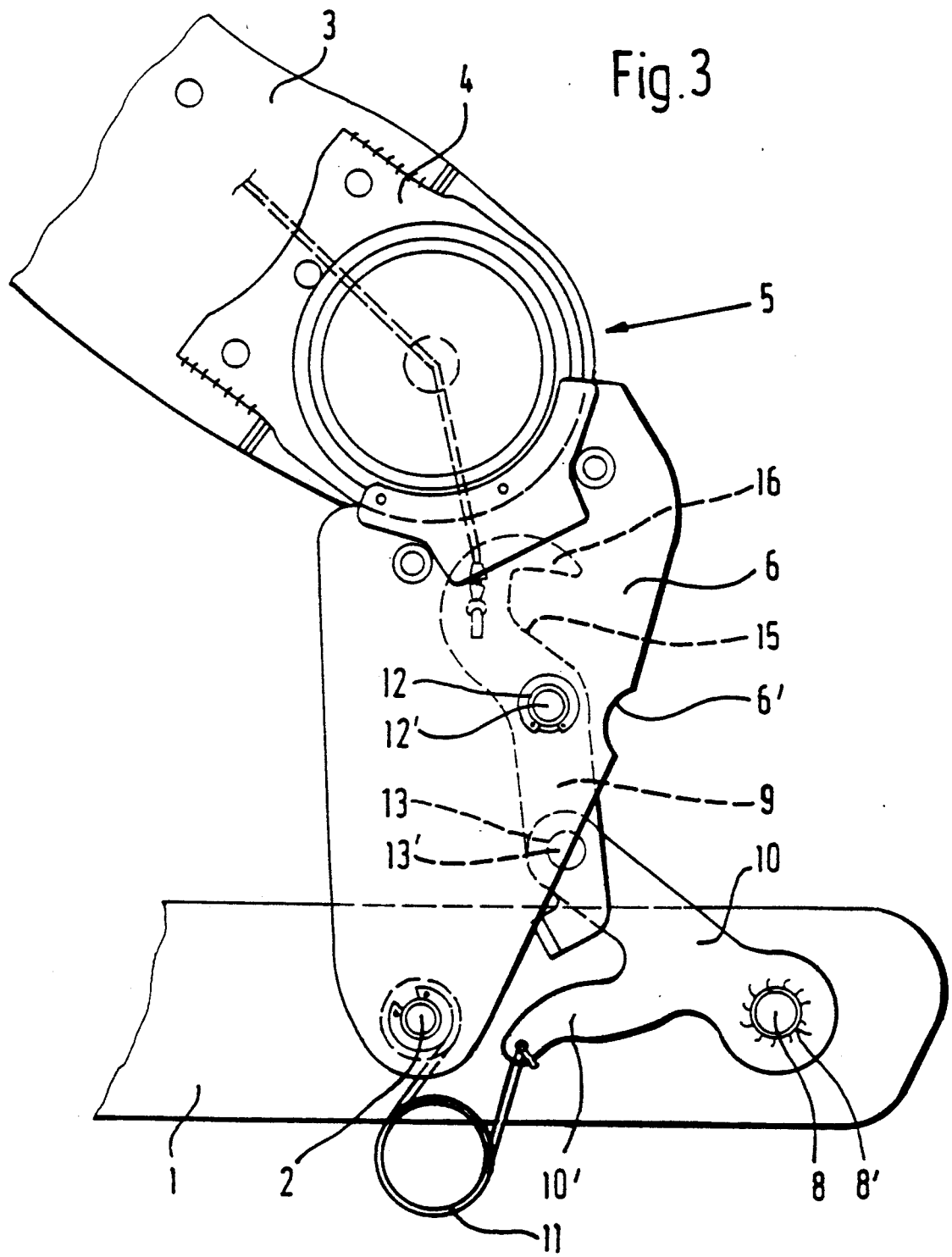
FIG. 3 shows an incomplete side view of the seat construction according to the present invention when the backrest is in a flip position near the forward end of the flipping range.

For the backrest to swing freely, it is first necessary to bring the toggle lever, beyond its extended position, into a buckling position, where the buckling points away from the flipping axle 2. This is achieved by means of the cable 17, which acts on the catch lever 9 behind the contact surface 15. The force exerted by the cable 17 causes the catch lever 9 to execute a swinging motion about the bearing pin 12, in a counterclockwise direction, according to FIG. 1. As a consequence, the pivot pin 13 is moved towards the flipping axle 2. In this way, the pivot pin 13 and the bearing pin 12 are brought into a position relative to the stop pin 8, which results in the toggle lever buckling in a direction which points away from the flipping axle 2. This corresponds to a tip of the triangle, defined by the longitudinal axes of the stop pin 8, the bearing pin 12, and the pivot pin 13, namely that tip which points away from the flipping axle 2. Referring to FIG. 3, if the backrest is now flipped forward, the catch lever 9 undergoes a further counterclockwise pivoting motion. This motion is superposed on the motion which the catch lever 9 executes together with the lower mounting part 6. The second lever 10 is here pivoted counterclockwise. When it has nearly reached the pivoting position shown in FIG. 3, it then undergoes a clockwise pivoting motion, until it has reached the position shown in FIG. 4. In the FIG. 4 position, the backrest cannot flip forward any further, because the protrusion 14 is in positive contact with the second lever 10, on that side of said lever which faces the flipping axle 2.

When the backrest is flipped back, both the catch lever 9 and the second lever 10 are necessarily pivoted and thereby necessarily brought into the position shown in FIG. 1, when the backrest has again reached its initial position. Thus, it is assured that the backrest is necessarily locked in this position Furthermore, the interlock is free of play.

In case of an accident, for example, the backrest can experience an excessive load in the forward direction. This may cause the second lever 10 and/or the catch lever 9 and/or the stop pin 8 to deform. These are the parts through which the load is transferred to the longitudinal strut 1. In this case, this deformation can cause the lower mounting part 6 to be flipped forward by a small angle. But this angle is small because hook 16 comes into contact with the stop pin 8 and prevents a further swinging motion. Indeed, the force acting on the backrest is now transferred directly, via the bearing pin 12 and the lower arm of the catch lever 9, to the stop pin 8 and thus to the longitudinal strut 1. The angle $\beta$ (FIG. 6) lies in the self-inhibition region, namely between 1° and 4°, and consequently the catch lever 9 cannot be swung out of this position by the load on the backrest. Therefore, as desired, the interlock device cannot loosen by itself only by means of the cable 17.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A vehicle seat comprising a seat structure which is to be connected to the floor of a vehicle, a backrest connected to a mounting means on each side of the seat, a flipping axle that runs along a transverse direction of the seat and pivotably connects said mounting means with said seat structure, said flipping axle having a flipping axis; a catch lever hinged at the mounting means, said catch lever having a first pivot axis parallel to the flipping axle; a stop located at the seat structure; said catch lever and stop forming an interlock upon contact to positively prevent a flipping motion of the mounting means; releasing means for unlocking said interlock; and wherein:

a) said first pivot axis of said catch lever is provided between a first end section, which contacts the stop at a contact point, and a second end section;
  b) the second end section of the catch lever is pivotably connected to a second lever by a pivot pin, said pivot pin having a longitudinal axis which is parallel to the flipping axis of the flipping axle;
  c) said second lever being connected to the seat structure which supports the stop, the second lever being pivotable about a second pivot axis that runs parallel to the first pivot axis of the catch lever;
  d) the longitudinal axis of the pivot pin, the pivot axis of the catch lever and the contact point of the stop for the catch lever define a triangle whose tip, formed by the pivot axis of the catch lever, points towards the flipping axle, when in an interlocked condition; and
  e) said releasing means being operatively connected with the catch lever such that the catch lever can be pivoted into a position that is raised from the stop, said triangle tip that is formed by the pivot axis of the catch lever pointing away from the flipping axle.

2. The vehicle seat of claim 1, further including a pre-tensioned spring which acts on the second lever at some distance from said second pivot axis, such that said spring loads the catch lever by way of the pivot to make contact with said stop.

3. The vehicle seat of claim 2, wherein said pre-tensioned spring is a leg spring, one of whose legs engages the flipping axle rotatably, and the other of whose legs engages the second lever.

4. The vehicle seat as in one of claims 1-3, in which the stop is a pin disposed parallel to the flipping axle and having a pin axis, and the second lever is pivotably mounted on said pin, said second pivot axis corresponding to said pin axis.

5. The vehicle seat as in one of claims 1-3, in which the catch lever is extended beyond the point which contacts the stop in the interlock position, and wherein this extension forms a hook which, in the interlock position, engages the stop with some play.

6. The vehicle seat according to claim 4, in which the catch lever is extended beyond the point which contacts the stop in the interlock position, and wherein this extension forms a hook which, in the interlock position, engages the stop with some play.

7. The vehicle seat of claim 5, said catch lever and said stop having a self-inhibition range, and wherein said hook has a flat surface which contacts the stop without play after the distance between the stop and the pivot axis of the catch lever has been increased due to an overload of the backrest and which encloses with a tangent, which is perpendicular to a line from the center of the stop to the pivot axis of the catch, an angle $\beta$ which lies in the self-inhibition range.

8. The vehicle seat of claim 6, said catch lever and said stop having a self-inhibition range, and wherein said hook has a flat surface which contacts the stop without play after the distance between the stop and the pivot axis of the catch lever has been increased due to an overload of the backrest and which encloses with a tangent, which is perpendicular to a line from the center of the stop to the pivot axis of the catch, an angle $\beta$ which lies in the self-inhibition range.

9. The vehicle seat of claim 8, wherein angle $\beta$ is between 1° and 4°.

10. The vehicle seat as in claim 1, further including a protrusion situated at the second end section of the catch lever, said protrusion extending into the path of motion of the second lever, and, when making contact with the second lever positively prevents a further flipping motion of the mounting means.

* * * * *